United States Patent
Fenlon

[19]
[11] Patent Number: 6,041,646
[45] Date of Patent: Mar. 28, 2000

[54] PACKAGE TESTER FOR TESTING PACKAGE INTEGRITY

[75] Inventor: Christopher Fenlon, Whitchurch, United Kingdom

[73] Assignee: Testamatic Limited, United Kingdom

[21] Appl. No.: 09/101,831

[22] PCT Filed: Dec. 20, 1996

[86] PCT No.: PCT/GB96/03180

§ 371 Date: Jul. 17, 1998

§ 102(e) Date: Jul. 17, 1998

[87] PCT Pub. No.: WO97/26521

PCT Pub. Date: Jul. 24, 1997

[30] Foreign Application Priority Data

Jan. 18, 1996 [GB] United Kingdom .................... 9601014

[51] Int. Cl.[7] ...................................................... G01M 3/34
[52] U.S. Cl. ........................................... 73/49.3; 73/865.8
[58] Field of Search ...................................... 73/49.2, 49.3, 73/818, 865.8

[56] References Cited

U.S. PATENT DOCUMENTS

| | | | |
|---|---|---|---|
| 5,259,237 | 11/1993 | Aarts | 73/49.3 |
| 5,309,750 | 5/1994 | Riley | 73/52 |
| 5,317,902 | 6/1994 | Stieger et al. | 73/49.2 |
| 5,786,530 | 7/1998 | Fenton | 73/49.3 |

*Primary Examiner*—Max Noori
*Attorney, Agent, or Firm*—Baker Botts, L.L.P.

[57] ABSTRACT

A package tester is provided which uses a rotating platen (10) to convey packages under test between first and second test positions. A compressive load (22) is applied to a package (50) before it reaches the first test position and travels with and remains in contact with the package as it moves towards the second test position. Thus, the package is kept under load for longer than is possible with known package testers working at an equivalent test rate.

17 Claims, 4 Drawing Sheets

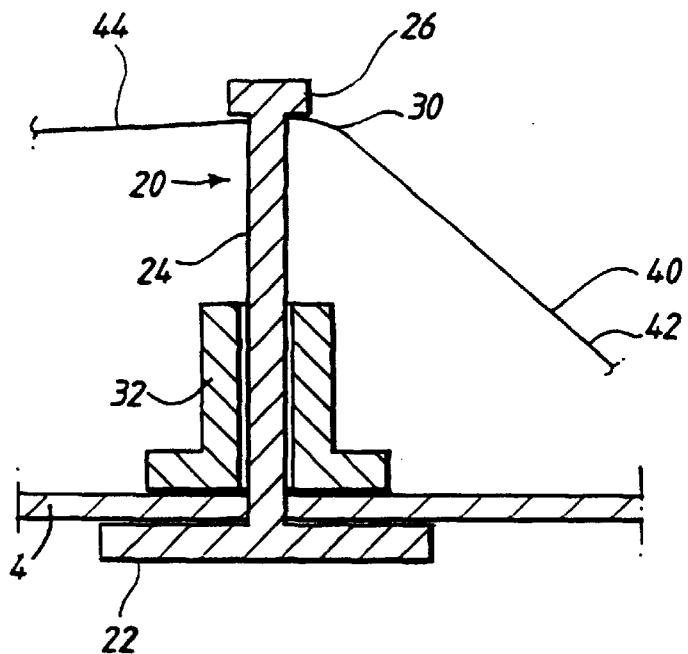
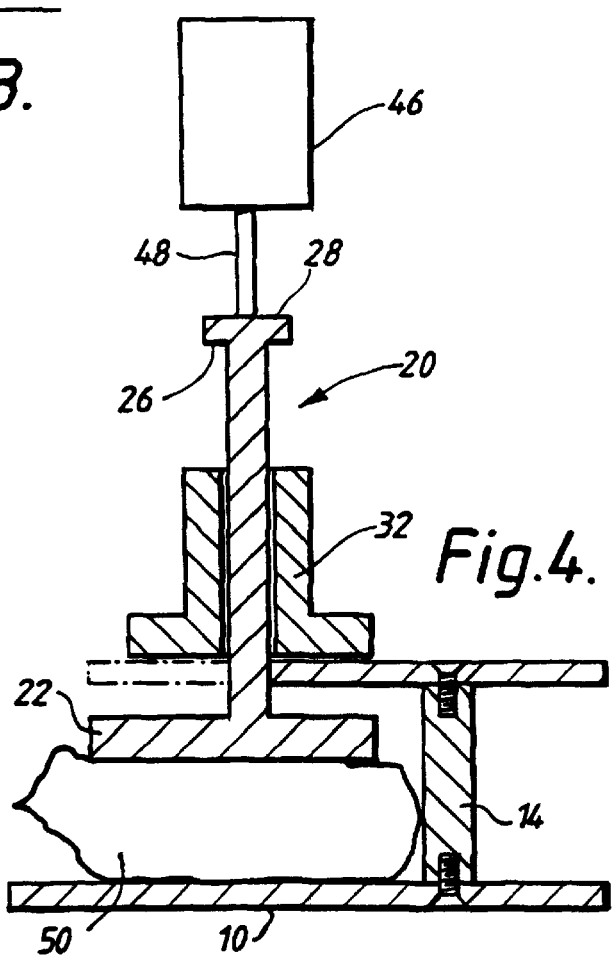
Fig.3.
Fig.4.

PACKAGE TESTER FOR TESTING PACKAGE INTEGRITY

The present invention relates to a package tester. Such a package tester is suitable for testing the integrity of the packaging for foods and snacks.

WO93/17317 discloses a package tester in which packages to be tested are conveyed along an endless conveyor belt which is continuously in motion. The tester has two testing stations, each of which comprises a test element moveable upwardly and downwardly by an actuator. Each test element incorporates a conveyor belt or rollers such that the package to be tested can still travel along the endless conveyor belt whilst each test element is in contact with the upper surface of the package. Measurements of the height of the test elements are made when they are in contact with the package to be tested, and these measurements are compared in order to determine if the package is leaking gas and consequently is defective. Thus, a load is applied to a package as it arrives at each test station, a measurement of the position of the test element is made and then the load is removed from the package before the package leaves each one of the test stations. The test load is applied only relatively briefly, and the measurements must be made rapidly because the package to be tested is continuously in motion on the conveyor belt.

According to a first aspect of the present invention there is provided a package tester, comprising means for moving a package to be tested between at least first and second test positions, the package being continuously subjected to a compressive load as it moves between the first and second test positions.

Thus, the effective length of each test can be increased without slowing the rate of throughput through the tester.

One or more packages may be conveyed on a rotating platen. The platen may be driven in an indexed manner or may rotate continuously during operation of the tester. The compressive load may be applied by bringing a weight into contact with the package.

According to a second aspect of the present invention there is provided a package tester, comprising conveying means for moving a package to be tested between at least first and second test positions, the conveying means being controlled such that it is stationary whilst the package is being tested at the test positions.

Keeping the package to be tested stationary whilst it is at a test position, enables measurements of the integrity of the package to be made with greater precision than may be made whilst the package is moving.

Preferably, the conveying means comprises a platen driven in an indexing manner. Devices for driving a platen in an indexing manner are well known commercial components available from a number of sources and need not be described in detail here.

The package tester may be arranged to test a plurality of packages simultaneously. Advantageously, the package tester operates by subjecting the or each package to be tested to a compressive load. The load increases the internal pressure within the or each package to be tested and urges a gas contained in the package to escape through any openings or apertures in the package. Since the package should be gas tight, loss of gas indicates a defective package.

Preferably, a test load is applied to the or each respective package prior to its arrival at the first test position and the test load is continuously applied to the or each respective package until after the or each respective package has been tested at the second test position. Thus, the load remains in contact with the package as it travels between the test positions. This increases the amount of time that the package is subjected to the test load and therefore increases the amount of gas that will escape through a given hole. This allows smaller holes to be detected than is the case with prior art package testers.

Advantageously, the platen is indexable between N positions where N is an integer greater than 1, and the platen carries a test load positioning disc. In a preferred embodiment, the positioning disc is attached to the platen so as to move with it.

Preferably, the test load positioning disc has a guide means for guiding the movement of the test loads perpendicularly to the plane of the platen.

Advantageously, the test loads are weights, for example, in the form of discs, which have upwardly protruding rods attached thereto. The guide means may comprise respective holes or passages formed in the test load positioning disc together with respective sleeves dimensioned such that the rod of each test load passes through a respective hole and sleeve and is held substantially coaxial within the sleeve but is freely moveable therein. Alternatively, a ring or further guide element may be positioned above or below the hole or passage so as to guide the test load.

Preferably, lifting means are provided for lifting each test load whilst it is at, or as it approaches, one or more of the N positions. Advantageously, the or each test load is lifted during part of its journey from the second test position to the first test position. Thus, packages can be removed from and placed on the platen whilst one or more test heads are lifted.

Advantageously, the upwardly projecting rods have camming surfaces thereon which engage with an inclined surface to lift the respective test load as it approaches selected ones of the N positions and to maintain the test load in a lifted state until after the load has passed the selected positions.

The use of weights to apply the test load overcomes the control problems associated with keeping the air pressure to a pneumatic actuator constant irrespective of changes in load, temperature, or atmospheric pressure. However, it will be appreciated that actuators could be used to apply the test loads if so desired.

Preferably, the first and second test positions have respective position sensors located thereat. Advantageously, the position sensors measure the position (for example, the height above the platen or distance below the sensor) of a portion of the test load. Advantageously, the position sensors measure the position of the top of the upwardly projecting rods. The position sensor may be contacting or non-contacting with the load or the projecting rods. If contacting sensors are used, such as cams or rods or other measurement elements which are displaced by coming into contact with the test load or an element attached thereto, then increased accuracy can be achieved by stopping the motion of the platen during the period in which the position measurement is made. This enables the measurement elements of the sensor to come to a rest before the measurement is made. However, if non-contacting sensors, such as optical or acoustic ranging devices (both of which are commercially available) are used, then there is no need to halt the platen in order to increase the accuracy of the measurements.

A preferred embodiment of the present invention comprises a platen indexable between eight positions, eight equally spaced test loads, and two test positions. The test loads have upstanding rods having enlarged heads. The enlarged heads can engage an inclined surface which causes the test loads to be lifted away from the platen at the seventh, eighth and first positions. In use, a first package to be tested is loaded on to the platen at the first position. The platen is then indexed so as to move the first package to the second position. During this motion, the test load associated with the first package is lowered on to the first package. A first position sensor is brought into contact with the top of the rod so as to measure its height above the platen. The first position sensor is then lifted away from the top of the rod and the platen indexed so as to move the first package to the third position. Alternatively, the motion of the platen may be used to separate the sensor and the rod. However, if non-contact sensors are used, then the sensor is not brought into contact with the rod. At each indexing, a new package is added to the platen and a measurement of the position of the test load on the previously added package is made. The platen is indexed until the first package reaches the sixth indexing position. This corresponds to a second test position, and a second position sensor is brought into contact with the top of the rod so as to measure its height above the platen. As before, a non contacting sensor may be used. This measurement is compared, by a data processor, to the corresponding measurement made by the first position sensor. If the difference between the measurements falls outside a predetermined acceptable range of values, the package is indicated as being faulty. The second position sensor is lifted away from the top of the rod (or contact broken by other means) and then the platen is indexed to bring the first package to the seventh indexing position. This position corresponds to an exit point for acceptable packages. If the package has passed the test, it is removed at this position. If the package has failed the test, the package is carried to the eighth indexing position where it is removed. The test load is lifted off the package as the package is carried between the sixth and seventh indexing positions.

It will be appreciated that the positions at which the good and bad packages are removed from the tester may be inter-changed. Alternatively, good and bad packages may be removed from the same position and separated by a diverter gate downstream of the package tester. Such an arrangement enables the second test position to be moved to the seventh position, thereby increasing the duration that each package is held under load.

Advantageously, the packages are removed from the tester by blowing with a stream of compressed air. This has the advantage that any grossly defective packages which have spilled product on to the tester will be removed, together with the spilled product. Thus, the tester is substantially self-cleaning.

Advantageously, the platen and the test load positioning disc have centrally disposed coaxial holes formed therein through which airlines and wiring to the sensors may pass to a control until which can conveniently be situated beneath the tester.

Advantageously, the platen may be profiled to form a series of containment areas. Alternatively, a further element may be positioned of the platen to define a series of containment areas. The containment areas may be generally U-shaped recesses facing radially outwardly. The recesses may be dimensioned to guide a pot to a position where it is aligned with a test element.

Preferably, a check weigher is provided in the input path or output path of the tester. The check weigher can be used to check that the weight of a package is within an acceptable range of limits. Packages outside this range are rejected.

Two or more testers may share the same platen.

The tester is not limited to having eight test elements or eight indexing positions, and the number of positions or elements can be freely chosen.

The present invention will further be described, by way of example, with reference to the accompanying drawings, in which:

FIG. 3 is a schematic diagram of the package tester at a seventh indexing position and illustrating an arrangement for lifting the test loads up off the platen;

Figure 5:
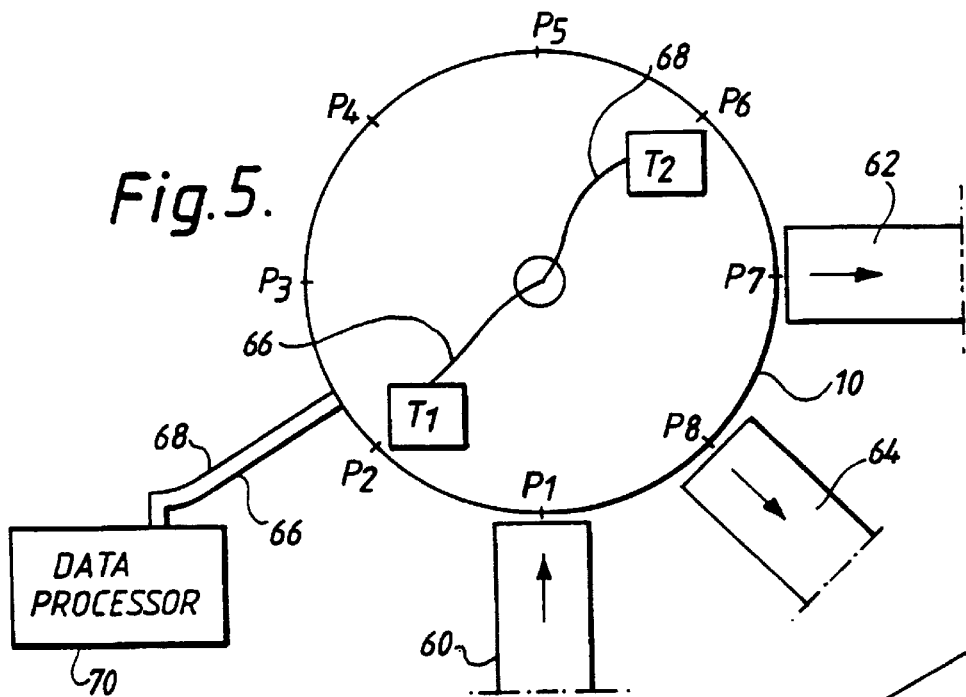
Figure 6:
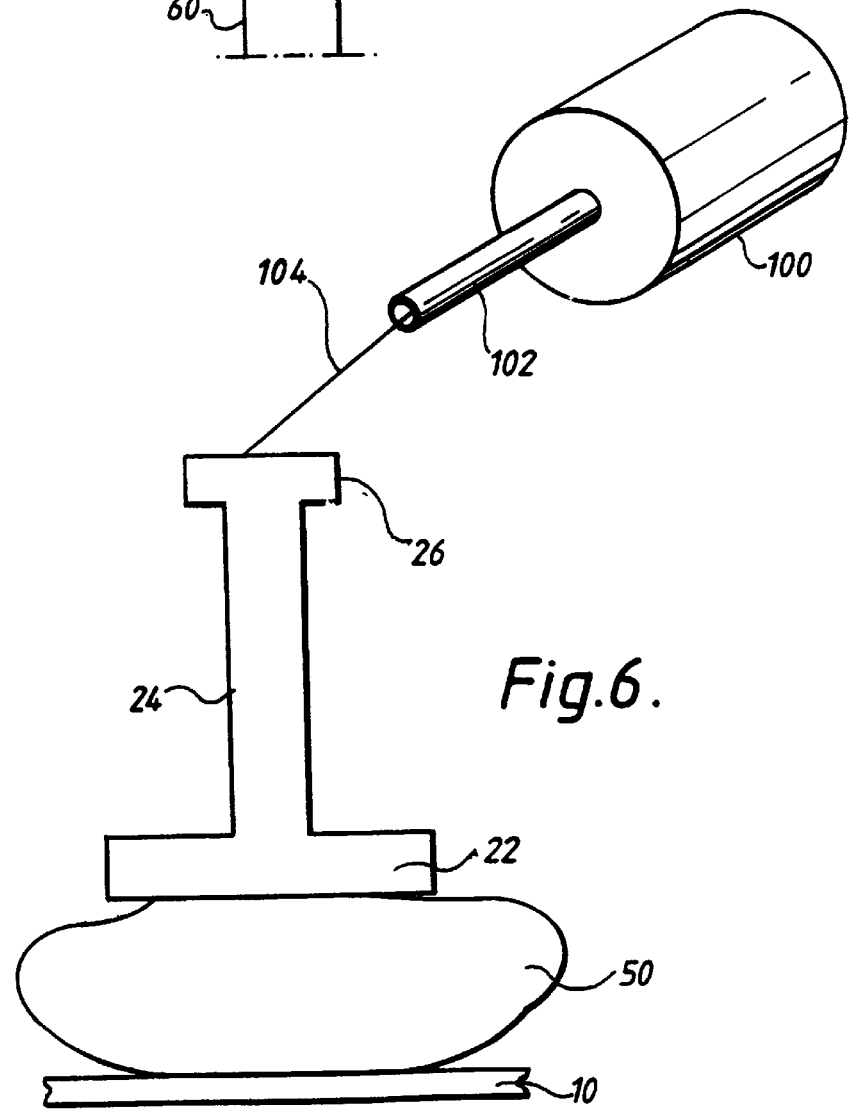
Figure 7:
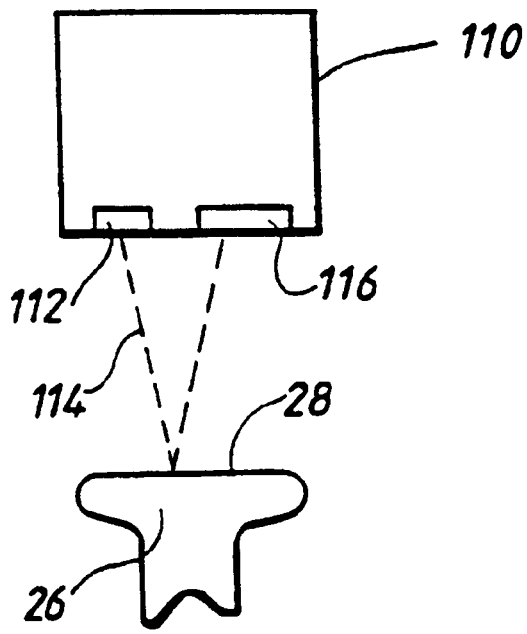

FIG. 4 schematically illustrates one of the test positions whilst a product is being tested;

FIG. 5 is a schematic plan view of the package tester;

FIG. 6 shows an alternative transducer arrangement;

FIG. 7 is a side view of a non-contacting sensor arrangement; and

Figure 8:
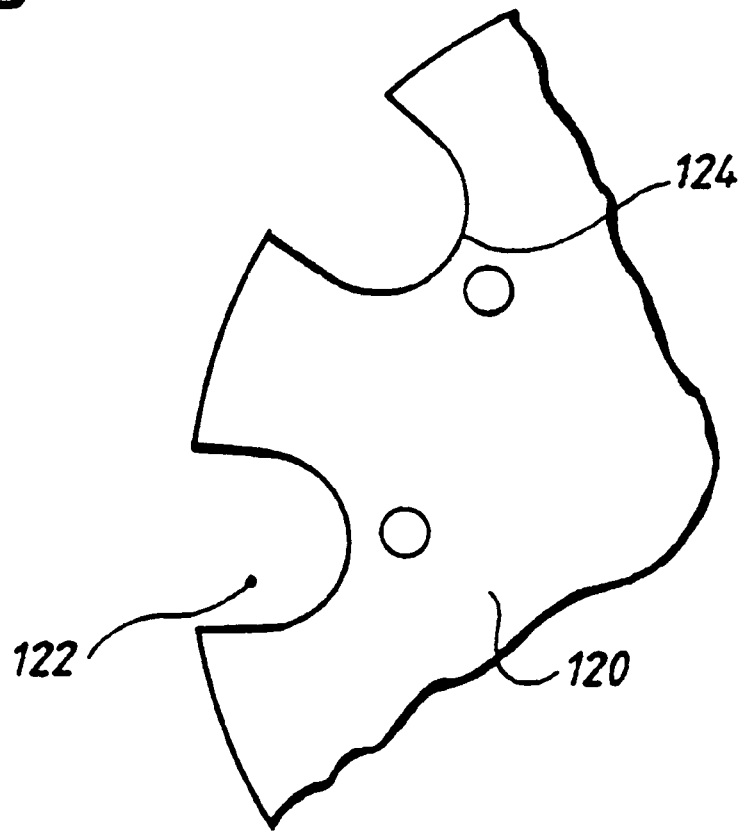

FIG. 8 is a plan view of part of an inset to hold pots on the platen.

Figure 1:
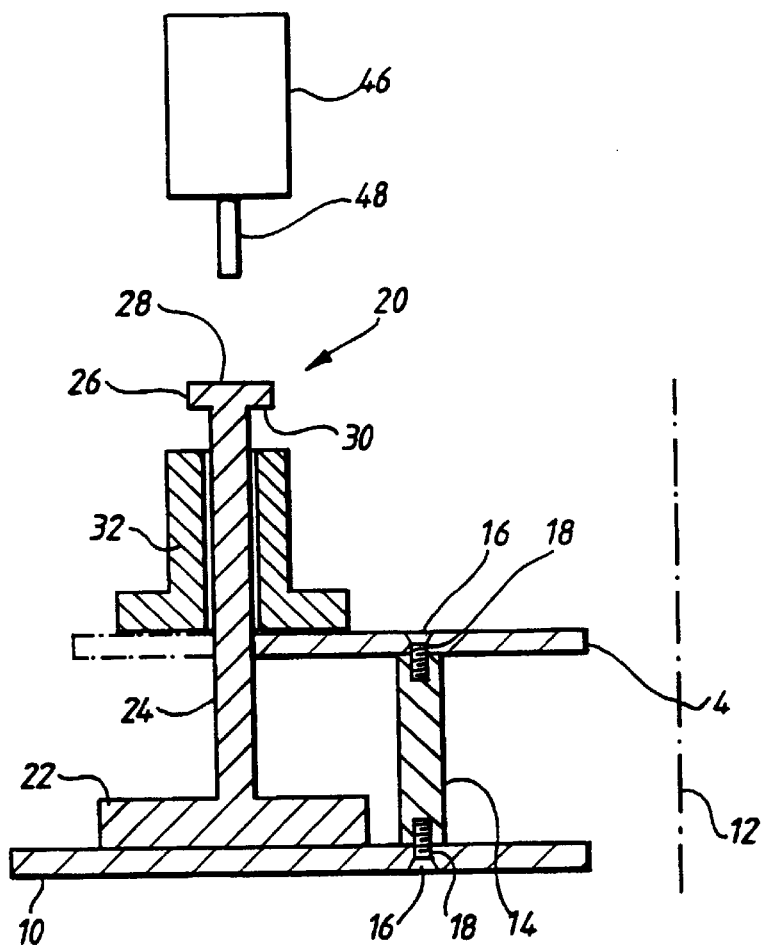
FIG. 1 is a schematic view of one of the test positions of a package tester constituting an embodiment of the present invention in the absence of a package to be tested.

FIG. 1 shows a cross-section through the package tester at one of the test positions. A platen 10 is rotatably supported on bearings (not shown) and is driven by an indexing drive (not shown). The chain-dot line 12 represents the axis of rotation of the platen 10. A test load positioning disc 4 is held above the platen 10 by a plurality of spacers 14. The spacers 14 are bolted to the platen 10 and the test load positioning disc 4. The bolts 16 pass through holes 18 in the platen 10 and the positioning disc 4. The length of the spacers 14 may be varied depending on the size of the packages that are to be tested.

Figure 2:
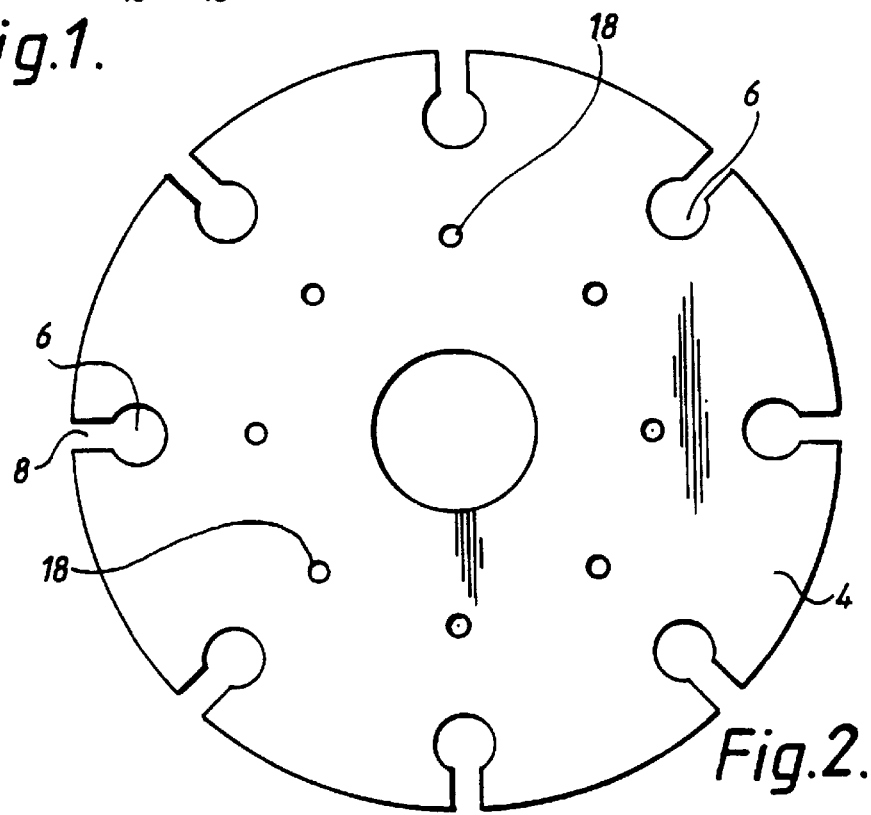
FIG. 2 is a plan view of the test load positioning disc.

As shown in FIG. 2, the test load positioning disc 4 for an eight positioning indexing package tester has eight guide holes 6 regularly spaced in the vicinity of the circumference of the disc 4. Each guide hole 6 is formed adjacent the circumference on disc 4 and is connected by a respective passage 8 to the edge of the disc 4.

A test load, generally indicated as 20 in FIG. 1, comprises a disc 22 and an upwardly extending rod 24. Rod 24 terminates in an enlarged head 26. An upper surface 28 of a head 26 acts as a measurement surface, whereas a lower surface 30 of the head 26 acts as a camming surface, as will be described later.

The rod 24 passes through a respective hole 6 in the test load positioning disc 4. The rod 24 is dimensioned such that it can pass through the channel 8, thereby allowing the test load to be removed from the tester. This allows the test loads to be varied depending on the product to be tested. A sleeve 32 encircles the test rod 24 and is removably attached to the test load positioning disc 4. The sleeve 32 is coaxially aligned with the hole 6 and serves to guide the rod 24 such that it is constrained to move vertically. The external diameter of the rod 24 is slightly smaller than the internal diameter of the sleeve 32, thereby enabling the rod to move within the sleeve with very little friction.

A first position sensor 46 is secured to a non-moving frame of the package tester and aligns with the enlarged head 26 when the platen 10 is stationary at an indexing position. The position sensor 46 has a protruding member 48 which can be lowered into engagement with the surface 28 of the enlarged head 26. A measurement of the position of the surface 28 beneath the sensor 46 is made when the member 48 abuts the surface 28. This measurement is supplied to a data processor as the first measurement for a given package. A similar second position sensor is located at another one of the indexing positions to make a second measurement, as will be described later.

FIG. 3 is a radially inwardly directed view of a portion of the package tester schematically illustrating one way of lifting the test loads clear of the platen 10 such that packages to be tested may be admitted to or removed from the package tester. A guide surface 40, which may be a ledge, a profiled circular camming element, or a stiff wire, follows a curved path over substantially a quarter of a revolution (i.e. so as to extend between three indexing positions. The curved path is coaxial with the axis of rotation of the platen and the surface 40 runs adjacent the innermost extent of the guide holes 6. The guide surface 40 is held on the stationary frame and hence does not rotate with the platen 10. The platen rotates in the direction of arrow A shown in FIG. 3. The leading edge of the guide surface 40 has an inclined region 42. Rotation of the platen causes the camming surface 30 of the enlarged heads 26 to abut the inclined region 42 and further rotation of the platen (and hence disc 4) causes the test load 20 to be lifted by the camming action between the surface 30 and the guide surface 40 thereby lifting the disc 22 clear of the platen. The guide surface 40 has a generally flat section 44 which maintains the test load 20 in the lifted state as the platen and hence the test load is indexed through (or rotates) a predetermined number of stations, i.e. indexing positions P7, P8 and P1 in this embodiment of the invention. An inclined lead-off portion (not shown) mirroring the shape of the lead-in portion 42 gently lowers the test load on to the platen or a product on the platen at a later stage of rotation, i.e. between indexing positions 1 and 2 in this embodiment.

As shown in FIG. 4, a package to be tested 50 such as a bag or a closed pot is inserted into the gap between the disc 22 and the platen 10. Rotation of the platen 10 causes the enlarged head 26 to lose contact with the guide surface 40 thereby lowering the disc 22 on to the package 50. When the package has been indexed to the test station, the member 48 is lowered under gravity from the test head 46 until the member 48 contacts the surface 28. A resolver within the test head 46 measures the distance that the member 48 has moved and thereby measures the position of the surface 28. The member 48 is then retracted by a suitable means, such as an electromagnetic or pneumatic actuator, leaving the platen free for further motion.

FIG. 5 schematically illustrates a plan view of a package tester according to the present invention. A conveyor belt 60 delivers a product to be tested to a first position P1. A check weigher (not shown) may be provided intermediate the belt 60 and the first position. The check weigher may have an inclined surface such that items slide over it. The supports 14 (as shown in FIG. 4) serve to act as stops preventing the product to be tested from moving coo far radially inward on the package tester. Once the product has been delivered, the platen 10 is indexed to bring the package to the position P2. This corresponds to the first testing station, as illustrated in FIG. 2. A measurement of the position of the surface 28 is made. Whilst this is occurring, a second package is placed on to the platen at P1. The platen 10 is indexed once again to bring the first package to position P3 and the second package to position P2, where it is measured. A third package is placed on the platen which is indexed again. The process is repeated until the first package reaches the position P6 which represents the location of the second test station T2. The test station T2 is identical to the first test station T1. A second measurement of the height of the surface 28 is made and this is compared with the first measurement for the first package. If the measurements differ by more than a predetermined amount, indicating loss of gas from the package, then the package is flagged as faulty. If the measurements are sufficiently close, then the package is deemed to be acceptable. The platen 10 is then indexed to bring the first package to position P7 where it is removed using an air jet or other suitable means (not shown) so as to place the good package on an exit chute or exit conveyor 62. Packages which have failed the test remain on the platen 10 until they reach position P8 when they are removed, again by an air jet or other suitable means, onto a discard chute or conveyor 64.

An advantage of the arrangement is that the packages remain under load whilst they travel from the first test position T1 to the second test position T2. This increases the amount of air that will be lost through a given hole or make detection of smaller holes possible. Furthermore, since the measurements are made when the platen is stationary, the position sensors 40 can have a greater resolution than is obtainable on prior art devices which make measurements whilst the product is moving.

It is thus possible to provide a compact and accurate package tester which can work at high speed and yet allows packages to remain under test for a relatively long period of time. For example, an eight station tester receiving sixty packs per minute enables each pack to have a test time of five seconds. This is a much longer test time than is available on conventional testers.

Two or more package testers may share a common controller. The test heads T1 and T2 are connected by respective cables 66 and 68 to a data processor 70 which stores the measurements, makes the comparisons of the measurements and controls the removal of packages from the tester.

The package tester need not work at a predetermined rate, but can work on demand. Thus, the tester remains stationary until a package has been delivered to position P1. A sensor, such as a light beam, can detect the arrival of a package. The platen is then indexed and remains at the new position until a further package is delivered. The data processor can keep a log of when the packages are delivered and hence compensate for the changes in travel time between the first and second positions T1 and T2 respectively, for different packages.

Additional test heads could be fitted it necessary, for example, to test if the rate of gas loss is sufficiently great for the purging to deform during the time at which it stays at a single indexing station.

A further advantage of the present invention is that the encoders of the position transducers are fixed on a stationary part of the apparatus and consequently the use of slip rings is avoided.

In an alternative embodiment, as shown in FIG. 6, the position sensors can be rotary encoders 100 mounted horizontally and an encoding shaft 102 may have a depending arm 104 or a cam mounted thereon such that movement of the platen an indexing position causes the enlarged head 26 to abut the arm or cam, thereby causing the encoding shaft to be rotated by an amount which is dependant upon the height of the package under test.

FIG. 7 shown an alternative sensor head arrangement. Non-contacting sensors 110 are provided at each of the first and second test positions. Such devices are commercially available and typically operate on acoustic or optical principals (such as laser ranging or measuring the position of a light spot). As shown in FIG. 7, a light source 112 directs a beam of light 114 at an angle with respect to a surface normal of the sensor 110. The light beam 104 is reflected from the upper surface 28 of a test load and is received by a photodector 116. The beam 114 is collimated and consequently, the position at which the light 114 impinges on the sensor head 116 is a function of the distance between the surface 28 and the sensor 110. The absence of any mechanical parts means that such an arrangement is capable of making rapid measurement and can do so accurately whilst the surface 28 is travelling with respect to the sensor 110.

FIG. 8 schematically illustrates part of a circular insert 120 which rests on the platen 10. The circular insert 120 has a plurality of U-shaped recesses 122 facing radially outwards. The innermost portion 124 of each recess is semicircular and has a radius of curvature designed to be slightly bigger than the base of a pot which it is desired to test. The centre of curvature of each recess moves a long a curved path as the platen rotates, the path passing directly under the axis of each test disc 22. Thus, in use, a pot is pushed towards the platen 10 in such a way that it engages within the recess 122 and comes to rest against the surface 124. A test disc 22 is then lowered on to the pot. This arrangement ensures that the pot is correctly positioned such that the test element 22 is lowered on to the centre of the lid of the pot.

In a further embodiment, the test loads may be lifted and lowered by respective actuators and one test element may serve to make the first and second test measurements. The platten is arranged to carry the package under test through more than one revolution such that the package makes two passes under the single test element. The actuators are controlled such that the package remains under a compressive load during the entirety of the time between the first and second test measurements.

Thus, a robust and accurate package tester can be provided.

I claim:

1. A package tester, comprising moving means for moving a package to be tested between at least first and second test positions and means for subjecting the package to a compressive load characterized in that the first and second test positions have respective position sensors and the means for applying the compressive load is a weight which remains continuously in contact with and travels with the package as the package moves between the first and second test positions.

2. A package tester as claimed in claim 1, characterized in that the moving means is a platen which rotates continuously during use.

3. A package tester as claimed in claim 1, characterized in that the moving means is a platen which is controlled such that it is stationary while the package is being tested at the test positions.

4. A package tester as claimed in claim 1, characterized in that the moving means is a platen which is driven in an indexing manner.

5. A package tester as claimed in claim 1, characterised in that the tester is arranged to apply a test weight to a package prior to the arrival of the package at the first test position and the test weight is continuously applied to the package until after the package has been tested at the second test position.

6. A package tester as claimed in claim 5 characterized in that the moving means is a platen which carries a test weight positioning disc having guide means for guiding the movement of the test weights.

7. A package tester as claimed in claim 1, characterised in that the test weights have upwardly protruding rods.

8. A package tester as claimed in claim 7, characterised in that the test weight positioning the disc has passages formed therein for accepting the upwardly protruding rods of the test weights, and in that the passages are connected to the periphery of the disc by open channels thereby enabling the test loads to be removed from the tester.

9. A package tester as claimed in claim 7, characterized in that the moving means is a platen which carries a test weight positioning disc having guide means for guiding movements of the test weights and the guide means comprise holes or passages formed in the positioning disc together with respective sleeves dimensioned such that the rod of the associated test weight passes through the hole and sleeve and is held substantially coaxial with the sleeve and is movable therein.

10. A package tester as claimed in claim 1, further comprising lifting means for lifting each test weight as it moves from the second test position towards the first test position.

11. A package tester as claimed in claim 10, characterized in that the test weights have upwardly protruding rods which have camming surfaces thereon which engage with an inclined surface to lift the test weight as it approaches a selected position and to maintain the test weight in the lifted state until after the test weight has passed a further selected position.

12. A package tester as claimed in claim 1, wherein the position sensors at the first and second test positions, respectively, measure the position of a portion of a plurality of test weights.

13. A package tester as claimed in claim 4, characterised in that the platen is indexable between eight positions, and the tester has eight equally spaced test weights and two test heads.

14. A package tester as claimed in claim 12, characterised in that a data processor compares the position measurement made by the first position sensor in respect of the package with the position measurement made by the second position sensor in respect of the same package and indicates the package as being faulty if the difference between the measurements falls outside a predetermined range.

15. A package tester as claimed in claim 1, characterised in that the packages are removed from the tester by blowing with a stream of compressed gas.

16. A package tester as claimed in claim 1, characterized in that the moving means is a platen which is profiled to form a series of containment areas, or in that a further element is provided to form a series of containment areas, for guiding packages to a correct position on the platen.

17. A package tester as claimed in claim 1, comprising a further element to form a series of containment areas, for guiding pots to a correct position on the moving means.

* * * * *